United States Patent [19]

Nakamura et al.

[11] 4,390,908
[45] Jun. 28, 1983

[54] PHASE SERVO CIRCUIT

[75] Inventors: Tadahiko Nakamura, Ayase; Kenji Nakano, Yokohama; Shigeru Tajima, Tokyo, all of Japan

[73] Assignee: Sony Corporation, Tokyo, Japan

[21] Appl. No.: 206,055

[22] Filed: Nov. 12, 1980

[30] Foreign Application Priority Data

Nov. 12, 1979 [JP] Japan .................. 54-146290

[51] Int. Cl.$^3$ .................. G11B 27/02; H04N 5/78
[52] U.S. Cl. .................. 360/70; 360/14.2
[58] Field of Search .................. 360/14, 70, 75, 14.1, 360/14.2; 358/311, 335, 337, 338

[56] References Cited

U.S. PATENT DOCUMENTS

| 3,729,583 | 4/1973 | Yano | 360/70 |
|---|---|---|---|
| 3,849,795 | 11/1974 | Koda et al. | 360/70 |
| 4,206,485 | 6/1980 | Sakamoto | 360/70 |
| 4,259,698 | 3/1981 | Takada | 360/70 |
| 4,306,254 | 12/1981 | Koda et al. | 360/70 |
| 4,307,417 | 12/1981 | Tokuyama | 360/70 |

FOREIGN PATENT DOCUMENTS

2026975 12/1971 Fed. Rep. of Germany ........ 360/70

*Primary Examiner*—Vincent P. Canney
*Assistant Examiner*—Donald McElheny, Jr.
*Attorney, Agent, or Firm*—Lewis H. Eslinger; Alvin Sinderbrand

[57] ABSTRACT

A phase servo circuit for controlling a rotatable magnetic head which is used for recording and/or reproducing a television signal includes a pulse generator for producing a pulse signal synchronous with the rotating phase of the rotatable magnetic head, a phase difference detecting circuit for generating a control signal which is used for controlling the rotating phase of the rotatable magnetic head, the control signal having a pulse width modulated in response to the phase difference between the pulse signal and the vertical synchronizing signal of a television signal to be recorded, another circuit for detecting the phase difference between the aforementioned vertical synchronizing signal and a second vertical synchronizing signal of a reproduced television signal and a modulating circuit for modulating the pulse width of the control signal in response to the output of the phase difference detecting circuit, whereby the phase angle of the first-mentioned and second vertical synchronizing signals are in synchronization with each other on a magnetic tape in order to carry out tape editing operation.

15 Claims, 62 Drawing Figures

FIG.12D (PEC-OUT)

FIG.12E (DPEB)

FIG.12F (REC-VD)

PHASE SERVO CIRCUIT

BACKGROUND OF THE INVENTION

1. Field of the Invention

This invention relates to a phase servo circuit. More particularly, the present invention relates to a phase servo circuit for controlling a rotatable magnetic head assembly in a video signal recording/reproducing apparatus having an automatic tape editing function.

2. Description of the Prior Art

In a helical scan type of video tape recorder (VTR) having two-heads, one head, one head with an auxiliary head, an automatic tape editing function is required when recording a second video signal to to be inserted on a portion of a magnetic tape on which a first video signal has been previously recorded or when joining the second signal on a tape at the end of a previously recorded first signal. Alternatively, a separate editing VTR can be used for such editing. Generally, control and synchronizing signals in the first and second video signal which are recorded on the magnetic tape have their phase adjusted with respect to each other before and after the respective editing point so that the final reproduced picture is fully synchronized.

Figure 1A:
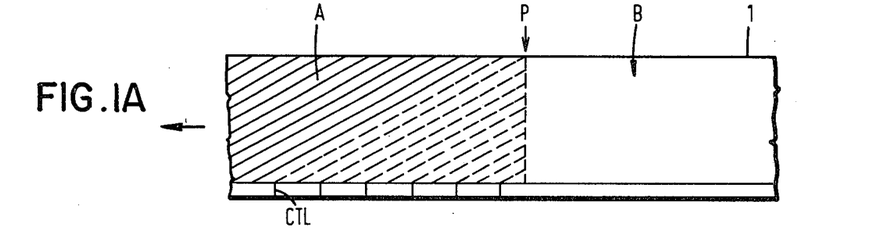
FIGS. 1A and 1B are schematic portions of a magnetic tape illustrating the recorded track pattern on the magnetic tape for explaining the "assemble" editing mode and "insert" editing mode.
Figure 1B:
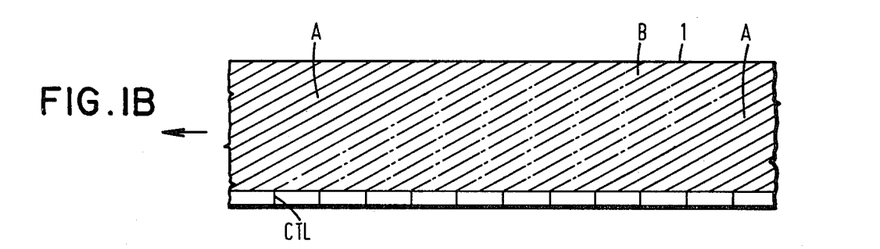

Generally, there are two types of editing, that is, "assemble" and "insert", as illustrated in FIGS. 1A and 1B, which show track patterns on a magnetic tape. In the "assemble" mode, after one cut of signal A of a recording is finished, a next cut of signal B is recorded so as to join it at the end of the first cut of signal A. A fixed full erase head is used in this mode to erase the entire recorded signal A including control signals (CTL), and then a new video signal B is recorded together with its control signals CTL on magnetic tape 1. It should be appreciated that parts of the recorded signal A on some tracks are erased, which parts are not desired to be erased, if the full erase head is immediately operated. Thus, a fixing-erase head or rotational erase head is operated for a predetermined time to erase certain video tracks of signal A, as shown by dotted lines in FIG. 1A. The full erase head is then operated after a point P, that is, a point where the full erase head does not catch any parts of the tracks of signal A.

For the "insert" mode, a B-video signal is inserted in, rather than after, the recorded A-video signal. In this mode, the B-video signal (dot-dashed lines) is recorded after a portion of the A-video signal (solid lines) is erased by the flying erase head, with the exception of the CTL signals, as shown in FIG. 1B.

In the above "assemble" and "insert" editing modes, a rotary head-phase servo system of the editing VTR is locked on the basis of the vertical synchronizing signals of the recording B-video signal, while the recorded A-video signal is reproduced for carrying out a "capstan tracking servo" operation which controls tape transportation on the basis of the reproduced CTL signals and rotational phase detecting pulses (PG pulse) of the rotary drum assembly. Therefore, the phase relation between the vertical sync signal of the recording B-video signal and the reproduced CTL signal of the recorded A-video signal is adjusted in the editing VTR before the tape arrives at the editing point on the tape. After arriving at the editing point, the editing VTR is changed over into its recording mode for recording the B-video signal, and the capstan servo system thereof only carries out a constant speed servo operation, in the "assemble" mode. On the other hand, in the "insert" mode, only the head drum servo system of the editing VTR is changed over to the recording mode and the capstan servo system is kept in its reproducing mode whereby the tracking servo operation is carried out on the basis of the reproduced CTL signal.

In the above manner, the phase relation between the sync signals in the A-video signal and the B-video signal are adjusted with respect to each other before and after the editing point, under normal conditions. However, if there is no satisfactory interchangeability between the playback VTR for obtaining the B-video signal and the editing VTR, or if the accuracy of the rotary head assembly and tape transportation assembly changes with the passage of time, phase agreement between the edited signals is not completely achieved.

Figure 2A:
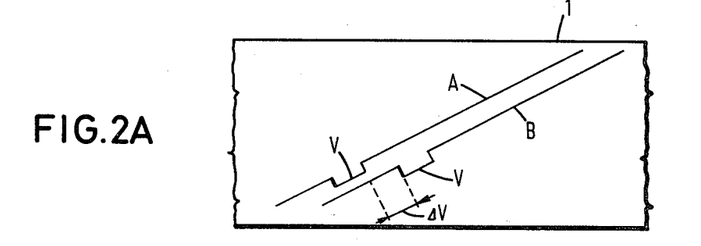
FIGS. 2A and 2B are schematic portions of a magnetic tape illustrating the portions of recorded sync signals on the tape and particularly showing sync signals having a phase difference before and after the editing point.
Figure 2B:
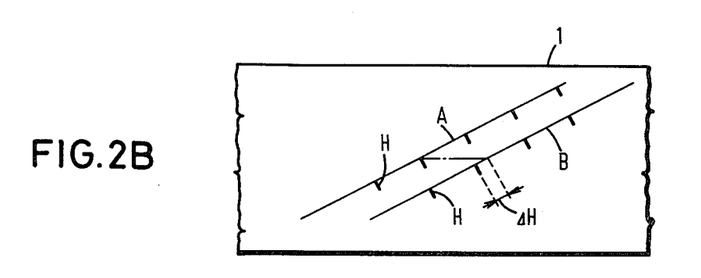

For example, as shown in FIG. 2A, if there is some phase difference $\Delta V$ between the vertical sync signals V of the recording B-video signal and those of the recorded A-video signal, the reproduced picture is vertically shifted at the editing point when the tape is played-back. Moreover, if there is some phase difference $\Delta H$ (FIG. 2B) between the horizontal sync signals H in the A- and B-video signals, horizontal oscillation of the monitor TV is pulled out and the reproduced picture drifts. In other words, "H-step out" occurs on the picture.

SUMMARY OF THE INVENTION

Accordingly, it is an object of this invention to provide a phase servo circuit in which the sync signal of a recording video signal has its phase adjusted in-phase with the sync signal of a recorded video signal to perfectly achieve an "insert" or "assemble" tape editing operation.

In accordance with this invention, a phase servo circuit for controlling a rotatable magnetic head which is used for recording and/or reproducing a video signal, includes:

a pulse generator means for producing a pulse signal synchronous with the rotating phase of the rotatable magnetic head, control signal generating means for generating a control signal for controlling the rotating phase of the rotatable magnetic head, the control signal having a pulse width modulated in response to the phase difference between the pulse signal and a first synchronizing signal of a video signal to be recorded, phase difference detecting means for detecting the phase difference between the first synchronizing signal and a second synchronizing signal of a reproduced video signal, and modulating means for modulating the pulse width of the control signal in response to the phase difference detecting means.

The above and other objects, features and advantages of this invention, will be apparent from the following detailed description of illustrative embodiments which is to be read in connection with the accompanying drawings.

DETAILED DESCRIPTION OF THE PREFERRED EMBODIMENTS

Figure 3:
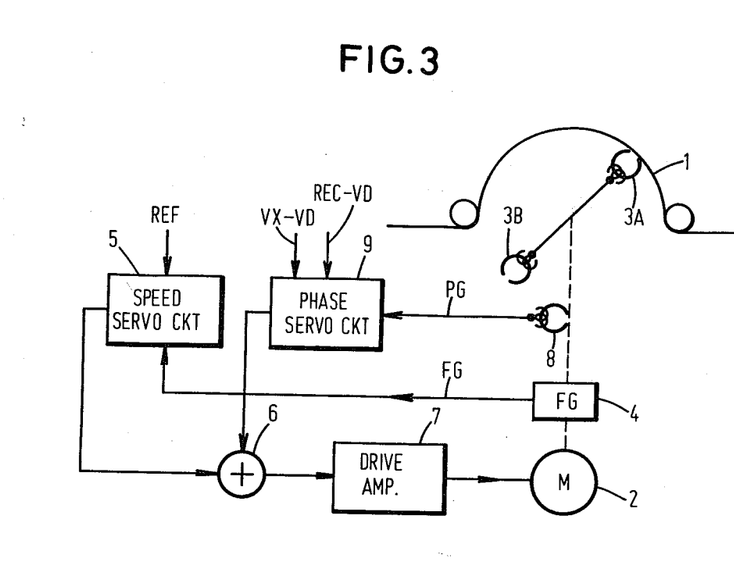
FIG. 3 is a block diagram of a rotational head drum servo system in a video tape recorder to which this invention is applied.

Referring to the drawings in detail, and initially to FIG. 3 thereof, there is shown a rotary drum servo system of a VTR to which the present invention is applicable. As shown in FIG. 3, magnetic heads 3A and 3B, mounted on a rotary drum (not shown) are driven or rotated by a drum motor 2 to form tracks at a predetermined angle on a magnetic tape 1 for recording or reproducing video signals thereon or therefrom. The rotating shaft (not shown) of drum motor 2 has a frequency generator 4 mounted thereon, the output of which is supplied to a speed servo circuit 5 which produces speed error signals on the basis of such output and reference signals REF supplied thereto. The speed error signals are supplied through an adder 6 to a drive amplifier 7, the output of which controls the speed of drum motor 2.

The rotational phase of magnetic heads 3A and 3B is detected by means of a pulse generator (PG) head 8 which supplies PG signals are supplied to a phase servo circuit 9, which is also supplied with a vertial synchronizing signal REC-VD at the time of recording and an external reference vertical sync signal (VX-VD), a reproduced control signal (CTL) or the like, at the time of reproduction. At the time of tape editing, such as in the "insert mode" or "assemble mode", the vertical synchronizing signal REC-VD of the video signal to be recorded is supplied to phase servo circuit 9 for conducting a phase adjustment with the recorded signal. The phase error signal from phase servo circuit 9 is added to the speed error signal in adder 6 and the output therefrom is then supplied through drive amplifier 7 to drum motor 2.

Figure 4:
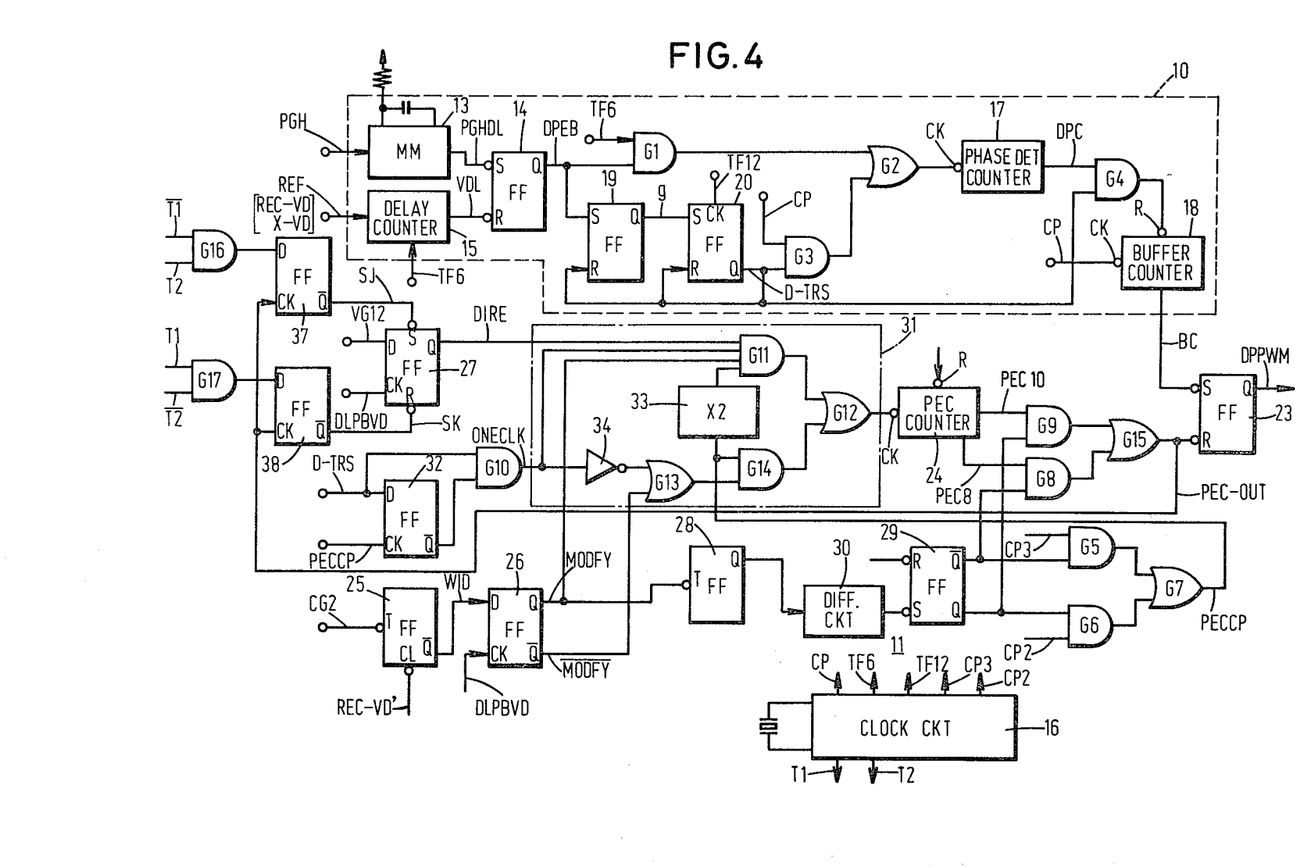
FIG. 4 is a block diagram showing a phase servo circuit according to one embodiment of this invention.

Referring now to FIG. 4, there is shown a circuit diagram of a phase servo circuit 9 according to one embodiment of the present invention. As shown by FIG. 5, the purpose of phase servo circuit 9 is to maintain the difference between the output pulse PG of PG head 8 (FIG. 5A) and the predetermined reference sync signal REF (FIG. 5B) at a constant phase difference $\phi$. This reference sync signal may be the vertical synchronizing signal of the recorded video signal at the time of recording or it may be an external reference sync signal, the reproduced vertical sync signal, or the like, at the time of reproducing.

Figure 5A:
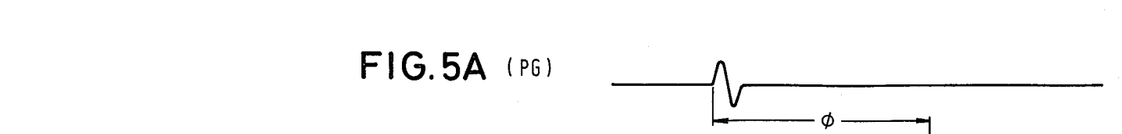
FIGS. 5 to 9 are waveform diagrams used for explaining the operation of the phase servo circuit of FIG. 4.
Figure 5B:
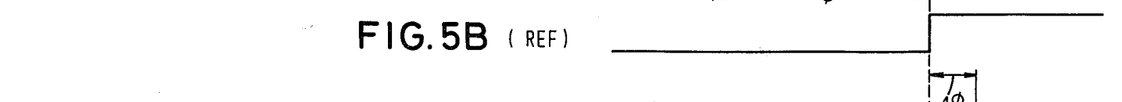
Figure 5C:
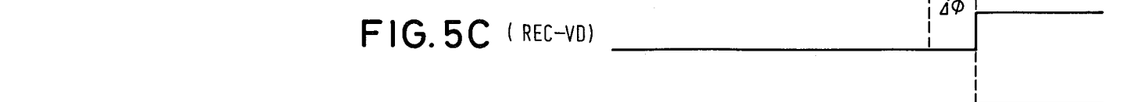
Figures 5D, 5E:
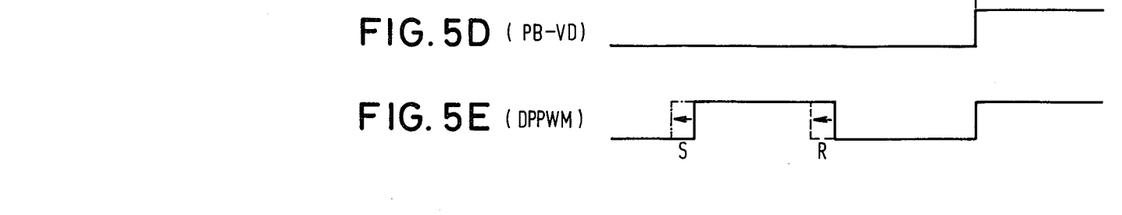
Figures 6A, 6B, 6C, 6D, 6E, 6F:
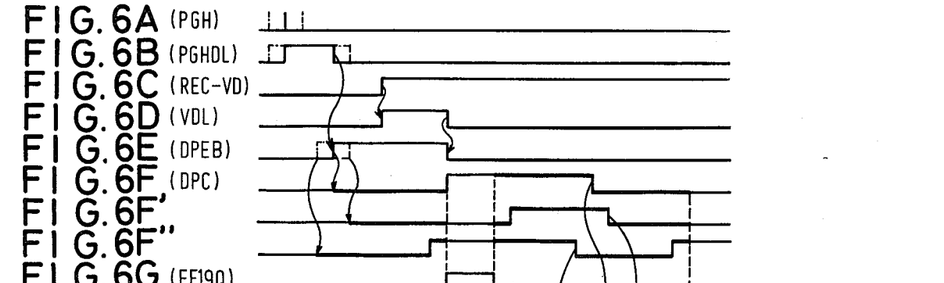

As shown in FIG. 4, phase servo circuit 9 includes a phase difference detecting circuit 10, enclosed by a dashed line, with the remainder of phase servo circuit 9 constituting an editing phase compensating circuit for adjusting the recording sync phase at the time of tape editing. The phase difference detecting circuit 10 detects the phase difference between the PG signal of FIG. 5A and the reference sync signal of FIG. 5B by counting clock pulses of a predetermined frequency, thereby providing a position modulated pulse having a predetermined period according to the counting result. In particular, a monostable multivibrator 13, as shown in FIG. 4, is provided with a PG pulse PGH (FIG. 6A) having a frequency of 3 OHz and obtained from the output of PG head 8. Thus, a signal PGHDL having a predetermined pulse width, as illustrated in FIG. 6B, is produced at the output of monostable multivibrator 13 and is used to set a flip-flop (FF) 14. When phase servo circuit 9 operates in the recording mode, vertical syncrhonizing signal REC-VD (FIG. 6C) of the video signal to be recorded is supplied to a delay counter 15 as a reference sync signal. The delay counter 15 counts a predetermined number of clock pulses TF 6 of a predetermined frequency from a clock circuit 16 in response to the reference sync signal so that a signal VDL (FIG. 6D) with a fixed time delay is obtained from the output of delay counter 15. This signal VDL is used to reset flip-flop (FF) 14.

A pulse signal DPEB, as shown in FIG. 6E, is obtained from the Q-output of FF 14. The pulse width of this signal represents the phase difference $\phi$ between PG pulse PGH and the recorded vertical sync signal to be recorded. The delay counter 15 is provided to simplify the counting operation and construction of a phase detecting counter which will be described hereinbelow. The output of FF 14 is supplied to one input of an AND gate G1 as a strobe signal. When the strobe signal is at a high level, clock pulses TF 6 supplied to the other input of AND gate G1 are passed through AND gate G1. The output of AND gate G1 is supplied through an OR gate G2 to a clock input CK of a phase detecting counter 17 which may be, for example, of a 512-counting type. When the pulse width of pulse DPEB representing the phase difference $\phi$ between the phase of the drum rotation and that of the recording synchronizing signal is at a value of a predetermined design standard, 256 clock pulses TF 6 are counted by phase detecting counter 17, as shown by the thick logic level "0" line in FIG. 6F from the start of the arrow, and the most significant bit MSB of the output of counter 17 rises to a high level, also as shown in FIG. 6F, precisely at the stop of the 256-pulse counting operation by counter 17.

The phase detecting counter 17 stores the counted number or value corresponding to the above phase difference $\phi$. When the PG pulse is delayed, as shown by the dashed line in FIG. 6A, the counted value of counter 17 is 256−x, where x is a variable, and the MSB output is still maintained at a low level at the termination of the counting operation, as shown in FIG, 6F, since 256 pulses have not yet been counted. On the other hand, when the PG pulse is advanced, as shown by the dot-dashed line in FIG. 6A, the counted number of counter 17 is 256+x, where x is a variable, and the MSB output rises to a high level at a time when the counting number is equal to 256, whereupon the outut DPC of counter 17 rises to a high or logic b "1" level, as shown in FIG. 6F'". Thereafter, pulses are further counted by counter 17 is in its logic level "1" state until the variable x is satisfied.

Figures 6G, 6H, 6I, 6J, 6K:
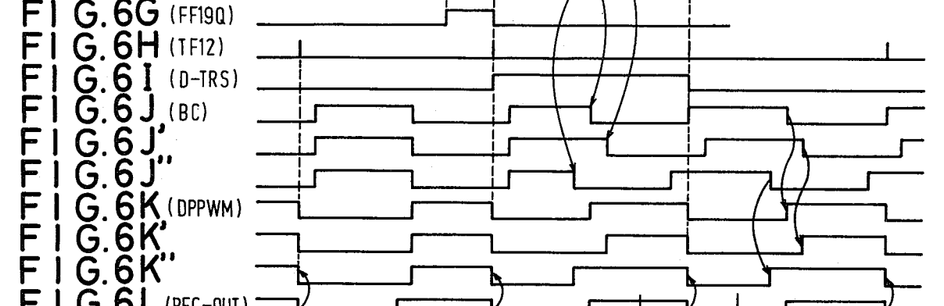

Phase difference data detected by counter 17 is read and transferred to a buffer counter 18. Data reading may be effected by supplying the output signal DPEB of flip-flop 14 to the set input of a flip-flop 19 so that, at the trailing edge of the set input signal DPEB, flip-flop 19 is set, as shown in FIG. 6G. The Q-output of flip-flop 19 is supplied to the set input of a flip-flop 20, and accordingly flip-flop 20 is set by the timing of a clock pulse TF 12 (FIG. 6H) supplied to a clock input CK of flip-flop 20, as shown in FIG. 6I. Since the Q-output D-TRS of flip-flop 20 is supplied to the reset input terminals R of flip-flops 20 and 29, flip-flop 19 is reset by one clock pulse TF12 and flip-flop 20 is reset at the next clock pulse TF12, as shown in FIG. 6I. Accordingly, signal D-TRS having a pulse width for equal to one period of clock pulse TF 12 is obtained from flip-flop 20.

The block pulse TF 12 is formed by clock circuit 16 and the period where signal D-TRS is at a high level corresponds in length to 512 clock pulses TF 6.

The output D-TRS (data transfer pulse) of flip-flop 20 is supplied to an AND gate G3 as a strobe pulse so that clock pulses CP from clock circuit 16 which are also supplied to AND gate G3, are supplied to the clock input of phase detecting counter 17 through gates G3 and G2. As a result, counter 17 resumes recounting as indicated by the thick line in FIG. 6F which starts at the same time as the leading edge of the output D-TRS, and increases the counting number of counter 17 from the basis or counting number (phase difference data) previously stored in counter 17. Accordingly, the most significant bit of output DPC of counter 17 falls to a low or logic "0" level when the number 512 is counted by counter 17, as shown in FIG. 6F. The position of the trailing edge is determined in accordance with the previously counted phase difference data, as shown in FIGS. 6F, 6F' or 6F'''. Thus, information regarding the phase difference $\phi$ between the PG pulse and the recording sync signal is obtained by means of a position modulation, that is, by means of position data from the trailing edges of the output of counter 17.

The output of counter 17 is supplied through an AND gate G4 to a reset input R of buffer counter 18. Counter 18 is a 512-counting counter and counts clock pulses CP from clock circuit 16. Accordingly, the output BC of counter 18 is a pulse signal having a predetermined period such that it rises to a high level after counting to the number 256 and returns to a low level after counting to the number 512, as shown in FIG. 6J.

When buffer counter 18 is reset by the output of counter 17, the circulating phase or O-count phase of counter 18 varies according to the phase difference data of phase detecting counter 17. Thus, the position data (FIGS. 6F, 6F' or 6F'''), that is, the trailing edges of the output of counter 17 are transferred to counter 18, as shown in FIGS. 6J, 6J' or 6J''', to reset counter 18.

The output BC of counter 18 is supplied to the set input of a flip-flop 23 so that the trailing edge of the output BC sets flip-flop 23, as shown in FIG. 6K. When the phase servo system shown in FIG. 4 is operated in the normal recording mode, the reset input of flip-flop 23 is provided with a reference timing signal such as, for example, clock pulses TF 12, as shown in FIG. 6H. Accordingly, the output of flip-flop 23 produces a pulse width modulated signal DPPWM (FIGS. 6K, 6K' or 6K'') which varies according to the phase difference $\phi$ between the PG pulse PGH and the recording sync signal REC-VD. The timing signal TF 12 is obtained from a phase error compensating (PEC) counter 24 which will be described hereinbelow. Thus, the timing signal TF 12 having a fixed phase and period is produced at the output of counter 24 by resetting the counter 24 with a predetermined timing signal at the time when the VTR is changed over to the recording mode.

The pulse width modulated signal DPPWM is inverted and transformed into an analog level through a low-pass filter (not shown), and then, is added to the output of speed servo circuit 5 in adder 6, as shown in FIG. 3. Accordingly, when the PG pulse is delayed from a desired phase position as shown by the dashed line in FIG. 6A, the position of the trailing edge of signal DPC is likewise delayed as shown in FIG. 6F', thus delaying the reset timing of buffer counter 18, as shown in FIG. 6J'. Consequently, the set timing of flip-flop 23 is also delayed, as shown in FIG. 6K', thereby extending the effective pulse width, that is, the low-level portion thereof, of the pulse width modulated signal DPPWM. As a result, the phase error voltage of the output of phase servo circuit 9 of FIG. 3 is increased and drum motor 2 is accelerated. Conversely, when the PG pulse is advanced, as shown by the dot-dashed line in FIG. 6A, the position of the trailing edge of the output DPC of counter 17 is leading, as shown in FIG. 6F''', thus advancing the reset timing of buffer counter 18, as shown in FIG. 6J'''. Thus, the set timing of flip-flop 23 is advanced and the effective pulse width of the pulse width modulated signal, that is, the low level portion thereof, is shortened, thereby decelerating drum motor 2.

As described above, the phase of the PG pulse with respect to the recording vertical sync signal REC-VD, that is, the rotating phase of the magnetic head, is fixed to a set value $\phi$, whereby the video signal to be recorded is fixed at the correct position on each track on the tape. On the other hand, during reproduction, for example, where a tracking servo operation is carried out by means of a capstan, an external vertical sync signal X-VD obtainable from a reference frequency source (for example, clock circuit 16 of FIG. 4) as a reference signal for the phase servo operation of the guide drum, is supplied to phase difference detecting circuit 10 as the reference signal REF. Accordingly, phase servo circuit 9 is operated so as to fix the phase difference between the PG pulse and the reference signal REF to a predetermined value, as shown in FIGS. 5A and 5B, in the same manner as during the recording operation.

During the editing mode, the recording vertical sync signal REC-VD is supplied to phase difference detecting circuit 10 of FIG. 4, as in the recording mode. Before reaching the editing point, the phase difference between the vertical sync signal REC-VD of the recording video signal B and the reproduced vertical sync signal PB-VD of the recorded video signal (A signal of FIG. 1) is detected, and the phase of the rotating head is varied so as to eliminate such phase difference, that is, to make the phases of the respective vertical sync signals REC-VD and PB-VD equal to each other. Thus, the phase difference between signal REC-VD and the PG pulse is varied by a value $\Delta\phi$ from a fixed value $\phi$, thereby adjusting the phases of the signals REC-VD and PB-VD (FIG. 5D). The phase adjustment may be conducted by adjusting the reset signal of flip-flop 23 of FIG. 4.

The operation of editing phase compensating circuit 11 of FIG. 4 will now be described with reference to the time charts as shown in FIGS. 7 to 9.

Figures 6L, 6M, 6N:
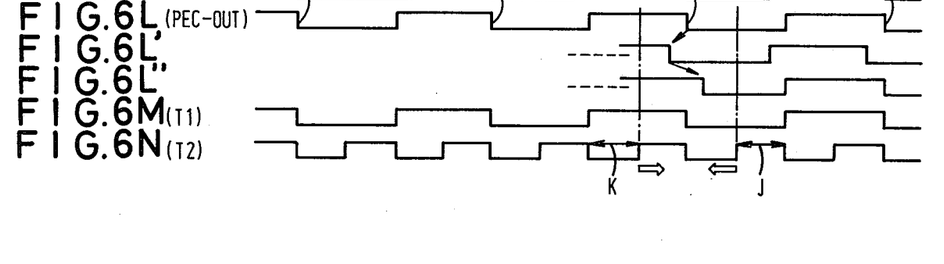

Referring to FIG. 4, phase error compensating counter 24 (hereinafter referred to as "PEC counter") may be a 10-bit counter. Counter 24 produces an output PEC (FIG. 6L) having the same period as the output BC of buffer counter 18 (FIG. 6J) which stores phase servo data in the form of its circulating count. This output PEC is supplied through a gate circuit to the reset terminal of flip-flop 23 for forming the pulse width modulated signal DPPWM. The timing of the reset of flip-flop 23 is varied according to the circulating phase or count of PEC counter 24 which is, in turn, varied according to the phase difference between REC-VD and PB-VD by adjusting the number of input clock pulses to PEC counter 24.

Figures 7A, 7B, 7C, 7D:
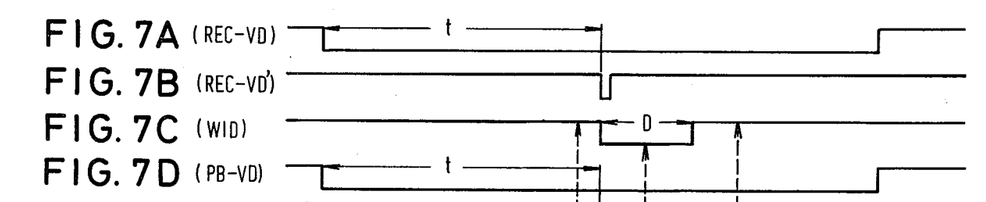
Figures 7E, 7F:
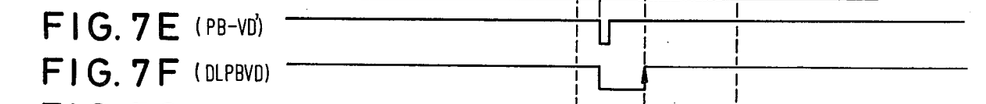

As shown in FIG. 7, a signal REC-VD' (FIG. 7B) which is delayed by a fixed time t from vertical sync signal REC-VD (FIG. 7A) of the recording video signal B is formed in a delay circuit (not shown). A single PB-VD' (FIG. 7E) which is delayed by the same time t from the vertical sync signal PB-VD (FIG. 7D) of the reproduced video signal A is also formed in a similar delay circuit (not shown). The phase compensating circuit 11 operates to correlate the phases of these signals REC-VD' and PB-VD'.

The signal REC-VD' is supplied to the clear input of a flip-flop 25 and a predetermined timing signal CG2 is supplied to the trigger input of flip-flop 25, whereby a signal WID having a predetermined pulse width D measured by its low level, low level as shown in FIG. 7C, is obtained from the $\bar{Q}$-output of flip-flop 25. This signal WID is used for detecting the correspondence of the phase of signal REC-VD to the phase of the reproduced signal PB-VD and is designed so as to eliminate a hunting operation upon detection of such correspondence by providing such predetermined pulse width D (blind zone). The signal WID is supplied to the data input D of a flip-flop 26 and a sampling pulse DLPBVD (FIG. 7F), which is delayed by a time period equal to half the width of signal WID, from the trailing edge of reproduced signal PB-VD', is formed and supplied to the clock input of flip-flop 26. Thus, the signal level of the correspondence-detecting signal WID at the trailing edge of the sampling pulse DLPBVD is read by flip-flop 26.

When the leading edge of sampling pulse DLPBVD is positioned within the low level portion or pulse width D of the phase correspondence-detecting signal WID, flip-flop 26 is reset to produce a signal MODFY of logic level "0". When the phase of signal PB-VD' is advanced or lags behind the phase of signal REC-VD', the leading edge of sampling pulse is DLPBVD may be positioned outside the low level portion or pulse width D of the phase correspondence-detecting signal WID. Flip-flop 26, at such time, is set to produce the signal MODFY of logic level "1". This latter command signal MODFY=1 corresponds to a condition requiring phase modification.

Figures 7F, 7G:
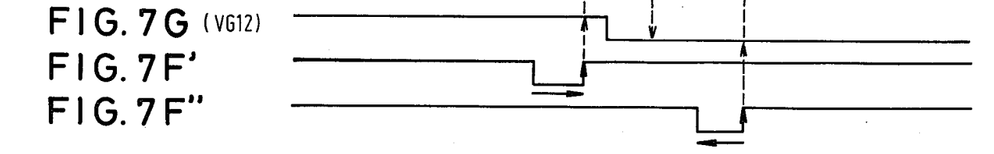

The sampling pulse DLPBVD is also supplied to the clock input of a flip-flop 27 and the data input D of flip-flop 27 is provided with a signal VG12, shown in FIG. 7G, which is of a high level before the signal REC-VD' (FIG. 7B) is produced, and is of a low level after the signal REC-VD' is produced. Flip-flop 27 is set or reset at the leading edge of sampling pulse DLPBVD in accordance with the levels of signal VG12 to produce a signal DIRE at the Q-output terminal thereof. The level of signal DIRE is used to indicate a phase-lead or phase-lag condition of signal PB-VD' relative to signal REC-VD'.

When sampling pulse DLPBVD shows a phase-lead relation, as shown in FIG. 7F', the signal DIRE (phase compensating direction indication signal) logic level "1", whereby phase modification is carried out in the direction shown by the arrow of FIG. 7F'. In contrast with this, when sampling pulse DLPBVD shows a phase-lag relation, as shown in FIG. 7F", signal DIRE becomes logic level "0", whereby phase modification is carried out in the direction shown by the arrow of FIG. 7F".

The amount of phase modification performed during each step is therefore varied in two ways in accordance with the phase difference relation to the phase correspondence-detecting range so as to shorten the phase modification time. In other words, a small modification step is selected in the vicinity outside the range D and a large modification step is selected in the phase region far outside the range D.

Figures 8A, 8B:
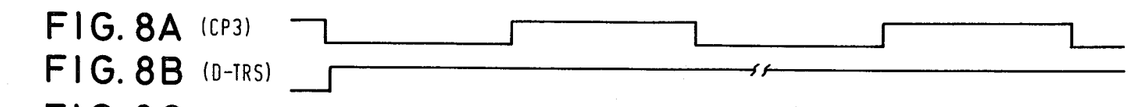

For the large step width control, phase modification command signal MODFY at the output of flip-flop 26 is supplied to a T-type flip-flop 28, in which the number of times that sampling pulse DLPBVD passes through the phase correspondence-detecting range D, that is, goes from leading to lagging and vice versa, are counted. The Q-output of flip-flop 28 is supplied through a differentiating circuit 30 to the set input terminal of a flip-flop 29 which has been reset at a time when the power of the VTR is turned ON. When the passing number of passes is less than two, flip-flop 29 remains in its reset condition. The $\bar{Q}$-output at logic level "1" of flip-flop 29 enables an AND gate G5 to pass clock pulses CP3 (FIG. 8A) having a relatively low frequency or long pulse period. The clock pulses CP3 are supplied to a pulse number control circuit 31 through an OR gate G7, whereby the phase of signal PB-VD relative to signal REC-VD is varied by larger steps as shown by phase points P1, P2, . . . P5 in FIG. 10.

Figure 9A:
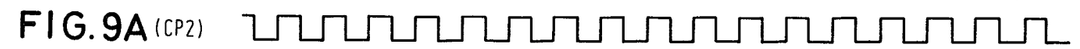
Figure 9B:
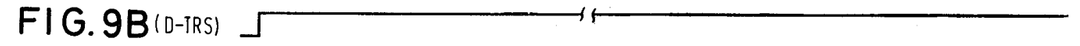
Figure 9C:
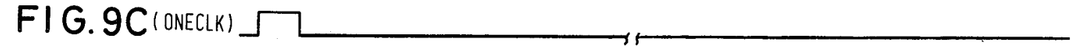
Figure 9D:
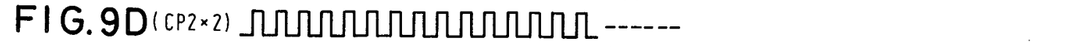
Figure 9E:
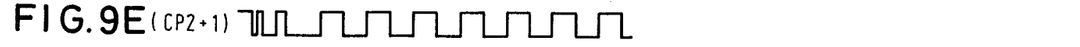
Figure 9F:
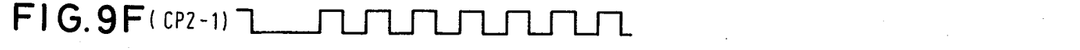
Figure 10:
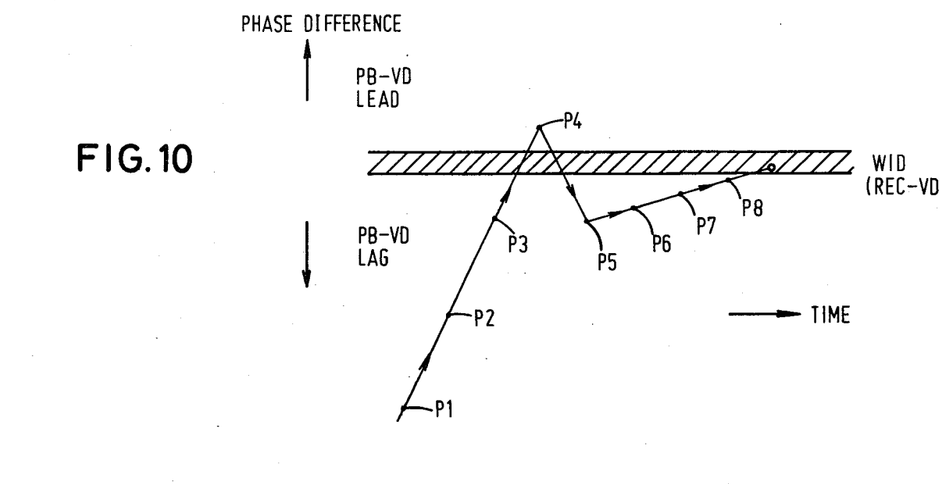
FIG. 10 is a graphical representation showing a process of phase adjustment between a reproduced sync signal and a recording sync signal, according to this invention.

When the phase variation path shown in FIG. 10 results in the second passage through the phase correspondence-detecting range D shown by the hatched portion, the Q-output of flip-flop 28 falls to a low or logic "0" level. This results in a negative going differential pulse at the output of differentiating circuit 30 which acts to set flip-flop 29. The Q-output at logic level "1" of flip-flop 29 enables an AND gate G6 to pass clock pulses CP2 (FIG. 9A) having a frequency which is four times greater than that of clock pulses CP3. The clock pulses CP2 are fed to pulse number control circuit 31 through OR gate G7, whereby the phase of signal PB-VD is varied by a small step width which is one-fourth as large as the former large steps.

With such step width control, when clock pulses CP3 are selected, the logic level "1" $\bar{Q}$-output of flip-flop 29 is fed to an AND gate G8 to select an output PEC8 from PEC counter 24, and when clock pulses CP2 are selected, the logic level "1" of flip-flop 29 is fed to an AND gate G9 to select another output PEC10 of PEC counter 24 which is two bits ($2^2=4$) greater than output PEC8. The period of output signal PEC-OUT (FIG. 6L) of PEC counter 24, thereby, is never varied, whether clock pulses CP3 or clock pulses CP2 are selected to be counted in PEC counter 24.

The number of times that the sampling pulse passes through the phase correspondence-detecting range D of FIG. 10 may otherwise be detected by counting the number of changes in level of the phase compensating direction indication signal DIRE, corresponding to the number of return points P . . . of FIG. 10. Alternatively, another zone formed by a predetermined pulse width may be provided on each side of the phase correspondence-detecting range D. The phase modification step width may be shortened when the phase error is included within the zone, and the step width may be enlarged when the phase error is outside of the zone.

Figures 8C, 8D:
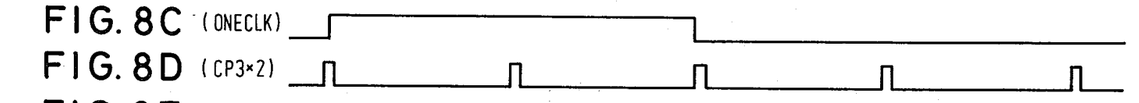

Clock pulses PECCP, which includes clock pulses CP3 or CP2, from the output of OR gate G7, are supplied to a clock input terminal of a D-type flip-flop 32. A data input D of flip-flop 32 is provided with the aforementioned data transfer signal D-TRS shown in FIGS. 6I, 8B and 9B. Flip-flop 32 delays the signal D-TRS by one pulse period of the clock pulse PECCP to produce as an output a delayed negative going pulse at the $\overline{Q}$-output terminal thereof. The Q-output signal of flip-flop 32 is supplied to an AND gate G10 together with the original signal D-TRS. Thus, a pulse ONECLK having one pulse period of clock pulse PECCP is obtained at the output of gate G10, as shown in FIGS. 8C and 9C. The "one clock pulse" ONECLK is fed to an AND gate G11 in the pulse number control circuit 31. The "one clock pulse" may be formed each time that signal D-TRS is produced, that is, once every revolution of the rotary head drum.

The other inputs of AND gate G11 are supplied with phase compensating direction indication signal DIRE, phase modification command signal MODFY, and an output pulse (FIG. 8D and FIG. 9D) of a frequency multiplier 33 which doubles the frequency of clock pulses CP3 or CP2. Since signal MODFY is at logic level "1" and signal DIRE is at logic level "1" when the positive-going edge of sampling pulse DLPBVD is positioned at the phase relation shown in FIG. 7F′, two clock pulses (FIG. 8D) within the period of "one clock pulse" ONECLK (FIG. 8C) are fed to an OR gate G12 through AND gate G11. Concurrently, "one clock pulse" ONECLK is inverted by an inverter 34 and supplied to an AND gate G14 through an OR gate G13, and signal PECCP is also supplied to AND gate G14. Thus, clock pulses CP3 pass through AND gate G14 to be supplied to OR gate G12 during the low level period of the "one clock pulse" ONECLK.

Figures 8E, 8F:
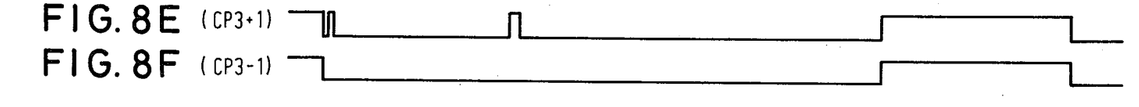

As a result, clock pulses shown in FIG. 8E are obtained at the output of OR gate G12, and are fed to a clock input terminal CK of PEC counter 24. Thus, counter 24 counts the pulses supplied thereto plus an extra pulse per one revolution of the head drum so that the phase of output PEC8 of counter 24 is advanced by one pulse period, as shown by FIG. 6L′. The output PEC8 is supplied to the reset input of flip-flop 23 as a phase adjustment pulse PEC-OUT through AND gate G8 and OR gate G15. As a result, the effective pulse width of the pulse width modulated signal DPPWM at the output of flip-flop 23 is widened to slightly increase the supply voltage to drum motor 2. Consequently, PG pulse is advanced and sampling pulse DLPBVD produced from the reproduced sync signal is shifted in the direction shown by the arrow of FIG. 7F′ relative to the PG pulse. The phase of the signal DLPBVD is thus varied as shown by points P1, P2 . . . of FIG. 10 for every rotation of the head drum.

When sampling pulse position DLPBVD is shifted to the phase P4 of FIG. 10 so as to pass through the phase correspondence-detecting region D, the phase relation of FIG. 7F″ results, whereby phase compensating direction indication signal DIRE becomes logic level "0" to close AND gate G11. Therefore, only the inverted "one clock pulse" $\overline{ONECLK}$ is supplied to AND gate G14 from inverter 34 through OR gate G13 so that clock pulses in which one pulse is thinned out or eliminated as shown in FIG. 8F, are fed from AND gate G14 to PEC counter 24 through OR gate G12. As the result, the phase of output signal PEC8 of counter 24 is delayed by one pulse period, as shown in FIG. 6L″, which reduces the effective pulse width (low level) of the pulse width modulated signal DPPWM at the output of flip-flop 23, as shown in FIG. 6K″. The supply voltage to drum motor 2 is therefore slightly reduced to delay the phase of the PG pulse. Thus, sampling pulse DLPBVD is shifted in the direction shown by the arrow of FIG. 7F″ relative to the PG pulse.

When the phase of the sampling pulse passes through the phase correspondence-detecting region D and is shifted to a point P5 of FIG. 10, the phase compensating direction indication signal DIRE returns from its logic level "0" state to its logic level "1" state. At the same time, the second passage of the sampling pulse through the region D is detected to select clock pulses CP2 having a frequency four times that of clock pulses CP3. Then, the clock pulses CP2 (FIG. 9E), including an extra pulse, are supplied to PEC counter 24 from pulse number control circuit 31 in the same way mentioned above with respect to pulses CP3. Thus, the phase of the sampling pulse is shifted by small steps, as shown by points P5, P6, P7 and P8, of FIG. 10. Alternatively, the phase of the sampling pulse may be shifted by small steps from the point P4 in the direction of the phase correspondence-detecting region D. In this way, clock pulses CP2 in which a pulse is thinned out once every revolution of the rotary head drum, as shown in FIG. 9F, may be supplied to counter 24.

When the leading edge of sampling pulse DLPBVD occurs in the region D, phase modification command signal MODFY at the Q-output of flip-flop 26 returns from its logic level "1" state to its logic level "0" state and the $\overline{Q}$-output of flip-flop 26 is fed to OR gate G13 of clock number control circuit 31 to pass continuous clock pulses CP2 therethrough. The clock pulses CP2 are supplied to counter 24 through gates G14 and G12 so that the phase angle of output PEC10 is kept constant after phase correspondence is achieved.

In this manner, the reset phase R(trailing edge) of the pulse width modulated signal DPPWM is varied as shown by the dotted line in FIG. 5E to result in phase correspondence between recording vertical synchronizing signal REC-VD (FIG. 5C) and reproduced vertical synchronizing signal PB-VD (FIG. 5D). Thus, a bias phase $\Delta\phi$ is added to the phase difference $\phi$ between PG pulse (FIG. 5A) and REC-VD (FIG. 5C).

When the pulse width of pulse width modulated signal DPPWM is varied as shown in FIG. 5E, phase difference detecting circuit 10 operates to change the set phase S (leading edge) of signal DPPWM for recovering the pulse width thereof to a balanced state, as shown by the dot-dashed line in FIG. 5E. In the stable operating condition of the phase servo system when phase control of the rotary head is established, the phase relation between PG pulse and REC-VD is steadily maintained or locked in the relation having a fixed phase difference $\phi+\Delta\phi$.

At the time of such editing phase compensation described above, the reset phase R of the pulse width modulated signal DPPWM should be kept in a predetermined permissible variable range, because of the possibility that the reset phase R may be varied too much so as to pass over the set phase S if restriction is not provided to the phase variable or adjustable range. When such undesirable condition occurs, the phase servo system is disturbed and the rotating phase of the head will turn a full circle during the editing phase compensation, which is undesirable. For that reason, the permissible phase variable range for phase compensation is restricted within a range defined between the two dot-dashed lines in FIGS. 6L, 6L' and 6L''.

In the circuit of FIG. 4, the phase adjustment pulse PEC-OUT obtained at the output of OR gate G15 is supplied to each clock input terminal of D-type flip-flops 37 and 38. Timing pulses T1 and T2, shown in FIGS. 6M and 6N and which are formed in clock circuit 16, along with inverted pulses $\overline{T2}$ and $\overline{T1}$ respectively, are supplied to AND gates G17 and G16, respectively. The outputs of gates G16 and G17, repectively representing zones J and K of FIG. 6N and which are situated and define the opposite sides of the restricted range, are supplied to D-inut terminals of flip-flops 37 and 38, respectively. Thus, if the zone J is sampled at the negative going edge of signal PEC-OUT, flip-flop 37 is set. The output SJ of flip-flop 37 from its $\overline{Q}$-output terminal is fed to a direct-set terminal S of flip-flop 27 to set flip-flop 27, resulting in a logic level "0" to logic level "1" transition of output DIRE, thereby indicating the phase compensation direction. Thus, the modifying direction of the trailing edge of phase adjustment pulse PEC-OUT is changed to the direction shown by the arrow pointing to the left of FIG. 6N.

In the same manner, when the other zone K is sampled, flip-flop 38 is set to produce an output signal SK at its Q-output terminal, which resets flip-flop 27. Then, the modification direction of pulse PEC-OUT is changed to the direction shown by another arrow pointing to the right of FIG. 6N.

In the "assemble" editing mode, before arriving at an assemble point on the tape, the editing VTR operates in the reproducing mode with a functioning capstan servo operation for tracking, while the phase correspondence between the recording signal and the reproducing signal is achieved. After the "assemble" point on the tape, the adjusted phase relation is maintained and the editing VTR is changed over into the recording mode.

In the "insert" editing mode, before arriving at an "insert" point on the tape, a tracking servo operation is carried out in the reproducing mode in a similar manner as mentioned above. During the reproducing mode, phase adjustment between the recording signal and the reproducing signal is achieved. After the insert point on the tape, the tracking servo operation on the basis of the reproduced control signal CLT is continued, while the phase angle of the rotary head is kept constant or locked in the condition which is determined by the editing phase compensating circuit 11. In this condition, only the recording circuit in the editing VTR is changed over into the recording mode.

When the editing VTR is changed over into the normal recording mode from the editing mode, phase compensating data stored in PEC counter 24 must be cleared to cancel the phase bias $\Delta\phi$ given to the phase relation between the PG pulse and signal REC-VD.

Figure 11:
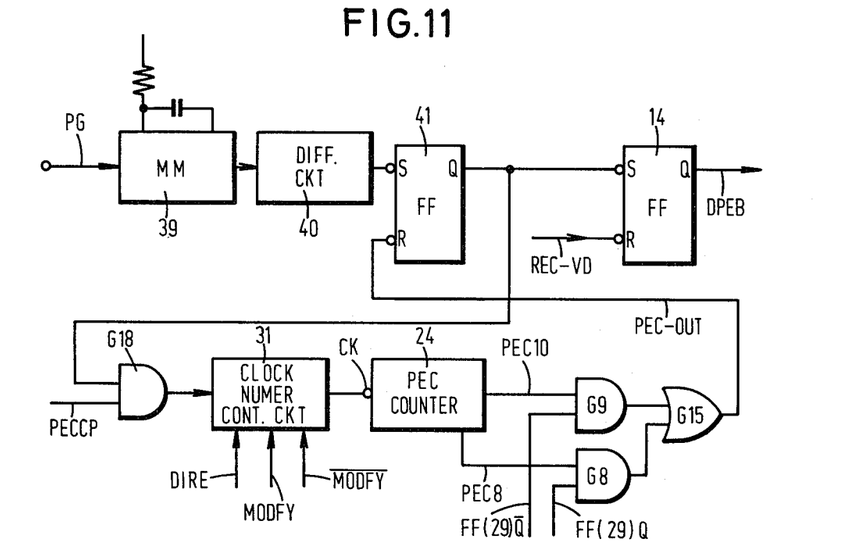
FIG. 11 is a block diagram showing a modification of a portion of the phase servo circuit of FIG. 4.

Accordingly referring to FIG. 11, there is shown a partial block diagram showing a modification of the embodiment of this invention , in which elements corresponding to those described above with reference to the apparatus of FIG. 4 are identified by the same reference numerals. FIGS 12A–12F are time charts used for illustrating the operation of the circuit of FIG. 11.

Figure 12A:
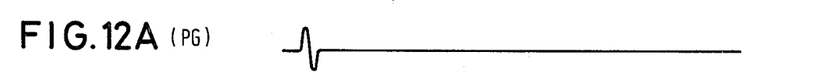
FIGS. 12A-12F are waveform diagrams used for explaining the operation of the circuit of FIG. 11.
Figure 12B:
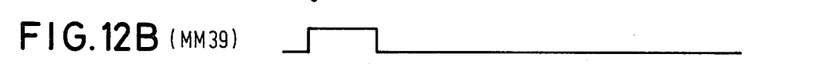
Figure 12C:
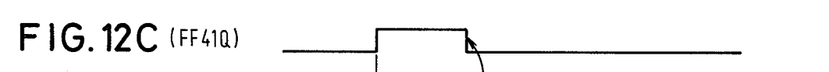

In this modification, a fixed delay time (FIG. 6B) through the monostable multivibrator 13 is controlled in accordance with the phase difference between signal REC-VD and PB-VD, thereby adding a compensation component $\Delta\phi$ to the set value $\phi$ between the phase angle of the PG pulse and REC-VD, as shown in FIG. 5. As illustrated in FIG. 11, PG pulse (FIG. 12A) is supplied to a monostable multivibrator 39 for adjustment of the signal timing, and which produces a delayed signal shown in FIG. 12B at the output thereof. The output of monostable multivibrator 39 is fed to the set input terminal of a flip-flop 41 through a differentiating circuit 40 to set flip-flop 41. A Q-output of flip-flop 41 rises to a high level, as shown in FIG. 12C at the trailing edge of the delayed signal (FIG. 12B). The output of flip-flop 41 is fed to an AND gate G18 as a strobe pulse to pass the clock pulses PECCP from the output of gate G7 in FIG. 4 therethrough to a clock number control circuit 31 which has the same construction as that shown in FIG. 4.

Figure 12D:
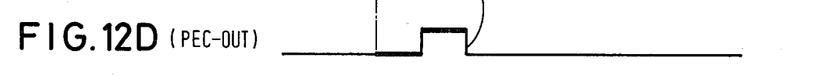

Clock number control circuit 31 has phase compensating direction indication signal DIRE and phase modification command signals MODFY and $\overline{MODFY}$, each produced as in FIG. 4, supplied thereto. Clock pulses which include a controlled number of pulses in response to the phase difference are formed in control circuit 31. The controlled clock pulses are fed to PEC counter 24, which carries out a counting operation shown by the thin line of FIG. 12D. When counter 24 counts a predetermined number of clock pulses, the output signal PEC10 or PEC8 falls to low level as shown in FIG. 12D.

The output signal PEC10 or PEC8 is selected by gate G9 or G8 and fed to a reset input of flip-flop 41 through OR gate G15. Therefore, flip-flop 41 is reset and the Q-output signal falls to a low level as shown in FIG. 12C. Thus, flip-flop 14, which has the same function as that in FIG. 4, is set. Since flip-flop 14 is reset by recording vertical sync signal REC-VD, a signal DPEB (FIG. 12E) is obtained at the Q-output of flip-flop 14. The pulse width of the signal DPEB represents the phase difference between the PG pulse and signal REC-VD, as previously illustrated in FIG. 6E. Phase difference data is obtained by measuring the pulse width of signal DPEB. The PG pulse and recording signal REC-VD are thus set in a fixed relation of having a phase difference $\phi$ in accordance with the phase difference data.

Figure 12E:
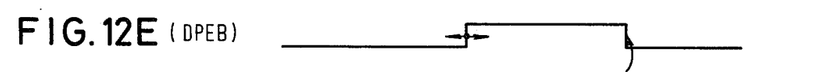
Figure 12F:
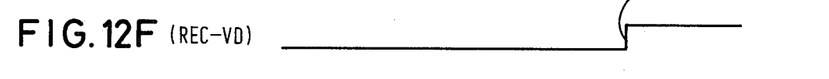

In a similar manner as the operation of FIG. 4, the number of clock pulses is increased or reduced by one pulse per one revolution of the rotary head drum so as to produce correspondence of the phase relation between recording signal REC-VD and reproduced signal PB-VD. Thus, the leading edge of the Q-output signal of flip-flop 14 is varied periodically step by step as shown by the arrow of FIG. 12E. As a result, a bias component $\Delta\phi$ is added to the phase difference between the PG pulse and signal REC-VD so that the phase difference between signals REC-VD and PB-VD is reduced to zero.

According to this invention as described above, a controlling pulse signal for controlling the rotary magnetic head is varied by pulse width modulation so as to produce a predetermined phase relation between a pulse signal (PG pulse) representing the rotational phase of the rotary magnetic head and the synchronizing signal (REC-VD) of recording video signal. Further, during edition of the tape, the PG pulse is varied by pulse width modulation in accordance with the phase difference between the sync signal (PB-VD) of the reproduced video signal and the sync signal of the recording video signal. Therefore, "assemble" or "insert" editing of the tape can be performed such that the phase angle of the sync signal of the recording video signal agrees with that of the recorded video signal before and after the editing point. Thus, when the edited tape is played back, a sudden vertical shift of the reproduced picture never occurs so that synchronous operation always results, whereby a reproduced picture of high quality can be obtained.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A phase servo circuit for controlling at least one rotatable magnetic head which is used for recording and/or reproducing a video signal, comprising:
   pulse generator means for producing a pulse signal synchronous with the rotating phase of said at least one rotatable magnetic head;
   control signal generating means for generating a control signal having a pulse width modulated in response to a first phase difference between said pulse signal and a first synchronizing signal of a video signal to be recorded for controlling said rotating phase of said at least one rotatable magnetic head;
   phase difference detecting means for detecting a second phase difference between said first synchronizing signal and a second synchronizing signal of a reproduced video signal; and
   modulating means for supplying a reference signal to said control signal generating means in response to said phase difference detecting means so that said pulse width of the control signal is further modulated in response to the second phase difference detected by said phase difference detecting means.

2. A phase servo circuit according to claim 1, wherein said control signal generating means includes first flip-flop means for producing said control signal and which is set by a signal corresponding to said first phase difference and is reset by said reference signal, and said modulating means includes counter means for counting a clock signal having a first frequency so as to generate said reference signal.

3. A phase servo circuit according to claim 2, in which said modulating means further includes control means for controlling the number of pulses of said clock signal supplied to said counter means in a predetermined duration in response to said phase difference detecting means.

4. A phase servo circuit according to claim 3, in which said phase difference detecting means includes window signal generating means for generating a window signal having a detecting width in response to said first synchronizing signal, and comparing means for comparing said window signal and said second synchronizing signal to generate a modification signal corresponding to a condition requiring phase modification of the rotating phase of said at least one rotatable magnetic head when said second synchronizing signal is outside the width of said window signal and for supplying said modification signal to said modulating means.

5. A phase servo circuit according to claim 4, in which said window signal generating means includes second flip-flop means receiving said first synchronizing signal and producing said window signal in response thereto, and said comparing means includes third flip-flop means of a D-type having a D-terminal receiving said window signal, a clock-terminal receiving said second synchronizing signal and an output for producing said modification signal.

6. A phase servo circuit according to claim 4, in which said phase difference detecting means further includes position detecting means for detecting the position of said second synchronizing signal with respect to said window signal and for producing an output of a first state when said second synchronizing signal is positioned in time ahead of said window signal and an output of a second state when said second synchronizing signal is positioned in time behind said window signal, said output being supplied to said modulating means.

7. A phase servo circuit according to claim 6, in which said position detecting means further includes locking means for locking the output of said position detecting means to said first state when said reference signal exceeds a first limit and to said second state when said reference signal exceeds a second limit.

8. A phase servo circuit according to claim 7, in which said position detecting means includes fourth flip-flop means of a D-type for producing said output and having a D-terminal and a clock terminal supplied with a direction signal and said second synchronizing signal, respectively, said direction signal having said first state when positioned in time before said window signal and said second state when positioned in time after said window signal.

9. A phase servo circuit according to claim 8, in which said fourth flip-flop means is provided with set and reset terminals which are connected with said locking means such that said fourth flip-flop means indicates when said first state exceeds said first limit and when said second state exceeds said second limit.

10. A phase servo circuit according to claim 9, in which said control means includes frequency doubler means for doubling the number of pulses to be supplied to said counter means in said predetermined duration, and gate means for feeding the pulses from said frequency doubler means to said counter means for said predetermined duration during one of said states of said fourth flip-flop means and feeding said number of pulses thereto for said predetermined duration during the other of said states of said fourth flip-flop means.

11. A phase servo circuit according to claim 3, in which said modulating means further includes means for changing the frequency of said clock signal supplied to said counter means.

12. A phase servo circuit according to claim 11, in which said means for changing includes first and second gate means supplied with first and second clock pulses, respectively, of different frequencies, and second flip-flop means for controlling said first and second gate means so that only one of said first and second clock pulses is supplied to said control means.

13. A phase servo circuit according to claim 12, in which said second flip-flop means includes a first flip-flop circuit for producing an output in response to said phase difference detecting means, and a second flip-flop circuit producing a Q-output supplied to said first gate means and a Q̄-output supplied to said second gate means in response to the output of said first flip-flop circuit.

14. A phase servo circuit according to claim 3, in which said control signal generating means includes second flip-flop means having a set input terminal supplied with said pulse signal and a reset input terminal supplied with said reference signal for producing an output signal, third flip-flop means having a set input terminal supplied with the output signal of said second flip-flop means and a reset input terminal supplied with said first synchronizing signal, and means for supplying said signal corresponding to said first phase difference to said first flip-flop means in response to said output signal from said third flip-flop means.

15. A phase servo circuit according to claim 14, in which said modulating means includes means for producing an output for changing the frequency of said clock signal supplied to said counter means, and said control signal generating means includes gate means supplied with said output of said means for changing and with said output of said second flip-flop means and producing an output in response thereto which is supplied to said control means.

* * * * *